United States Patent
Lazaroiu et al.

[11] 3,950,666
[45] Apr. 13, 1976

[54] DISK OR CUP ROTOR WITH STAMPED-OUT WINDING ELEMENTS FOR A LOW-INERTIA ELECTRIC MACHINE

[75] Inventors: Dumitru Felician Lazaroiu; Sigmund Sleiher; Gheorghe Mihai Mihaiescu, all of Bucharest, Romania

[73] Assignee: Institutul de Cercetare si Proietare Pentru Industria Eletrotehnica, Bucharest, Romania

[22] Filed: Aug. 12, 1974

[21] Appl. No.: 496,739

Related U.S. Application Data

[63] Continuation-in-part of Ser. No. 345,216, March 26, 1973, Pat. No. 3,869,788.

[52] U.S. Cl. ............................. 310/268; 310/237
[51] Int. Cl.[2] ........................................ H02K 1/22
[58] Field of Search ............ 310/268, 265, 267, 43, 310/261, 207, 198, 208, 67, 233, 237; 29/597, 598

[56] References Cited
UNITED STATES PATENTS

| | | | |
|---|---|---|---|
| 3,319,101 | 5/1967 | Bidard | 310/268 |
| 3,382,570 | 5/1968 | Knapp | 310/268 |
| 3,450,918 | 6/1969 | Burr | 310/268 |
| 3,480,815 | 11/1969 | Knapp | 310/268 |
| 3,488,539 | 1/1970 | Tucker | 310/268 |
| 3,500,095 | 3/1970 | Keogh | 310/268 |
| 3,549,928 | 12/1970 | Knapp | 310/268 |
| 3,566,165 | 2/1971 | Lohr | 310/67 |

*Primary Examiner*—R. Skudy
*Attorney, Agent, or Firm*—Karl F. Ross; Herbert Dubno

[57] ABSTRACT

A disk or cup rotor for a low-inertia electric machine has a pair of support bodies of revolution either constituted by inner and outer coplaner annular disks or aligned cylindrical tube sections. An array of elongated conductors is provided on each face of the outer body with the outer ends of these conductors projecting beyond the outer periphery of this outer body. The inner ends of at least half of the conductors terminate in the annular gap between the bodies and are there joined to other such terminating inner ends, whereas the remaining inner ends extends across the gap to the inner body where they form commutator bars that themselves extend beyond the inner periphery of the inner body and are joined at weld nodes to the commutator bars on the other face of the inner body. Several such inner and outer bodies may be stacked to create a multiturn coil effect. The conductors may form simple, closed, or waved windings or combinations of these types of windings with plural support bodies.

10 Claims, 11 Drawing Figures

DISK OR CUP ROTOR WITH STAMPED-OUT WINDING ELEMENTS FOR A LOW-INERTIA ELECTRIC MACHINE

CROSS-REFERENCE TO RELATED APPLICATIONS

This application is a continuation-in-part of copending patent application Ser. No. 345,216 filed March 26, 1973 now U.S. Pat. No. 3,869,788 and is related to copending patent application Ser. No. 496,740 filed concurrently herewith and also a continuation-in-part of Ser. No. 345,216.

FIELD OF THE INVENTION

The present invention relates to a disk or cup rotor having lamellar conductor windings. More particularly this invention concerns a disk rotor made by stamping and usable in an air-gap direct-current electric machine. In addition this invention relates to a cylindrical cup rotor with lamellar windings usable in radial air-gap direct-current electric machines, as well as to the particular windings of such rotors.

BACKGROUND OF THE INVENTION

There are known stamped lamellar conductor rotors without a separate commutator, so that the brushes ride directly on the conductors. These rotors have the disadvantage of wearing out quite quickly in the region engaged by the brushes. In addition, due to the relatively numerous conductors in this region, the rotor diameter much be relatively large.

There are also known stamped lamellar conductors carried on two layered rotors with separate commutator wherein the conductors, constitute extensions of the commutator bars and alternate with conductors having no commutator bars, so that the number of commutator bars represents one-half the number of conductors of a layer, and a section contains two turns. These rotors have the disadvantage that they cannot be used with machines having an even number of pole pairs and, because of the relatively large number of commutator bars, it is necessary to make the disk relatively large in diameter.

OBJECTS OF THE INVENTION

It is therefore an object of the present invention to provide an improved disk or cup rotor having improved lamellar windings.

Another object is the provision of such a rotor having commutator bars which have a longer service life than hitherto possible.

SUMMARY OF THE INVENTION

These objects are attained according to the present invention in a rotor wherein the number of turns per section as well as the ratio $m$ between the number $N$ of conductors and the number $K$ of commutator bars, is greater than two. Thus the number of commutator bars is reduced so that wider commutator bars may be employed which inherently will wear less. The disk rotor diameter is relatively small also. The windings which are utilized are applicable to any number $p$ of machine pole pairs, by choosing the ratio $m = N/K$ with reference to $p$.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
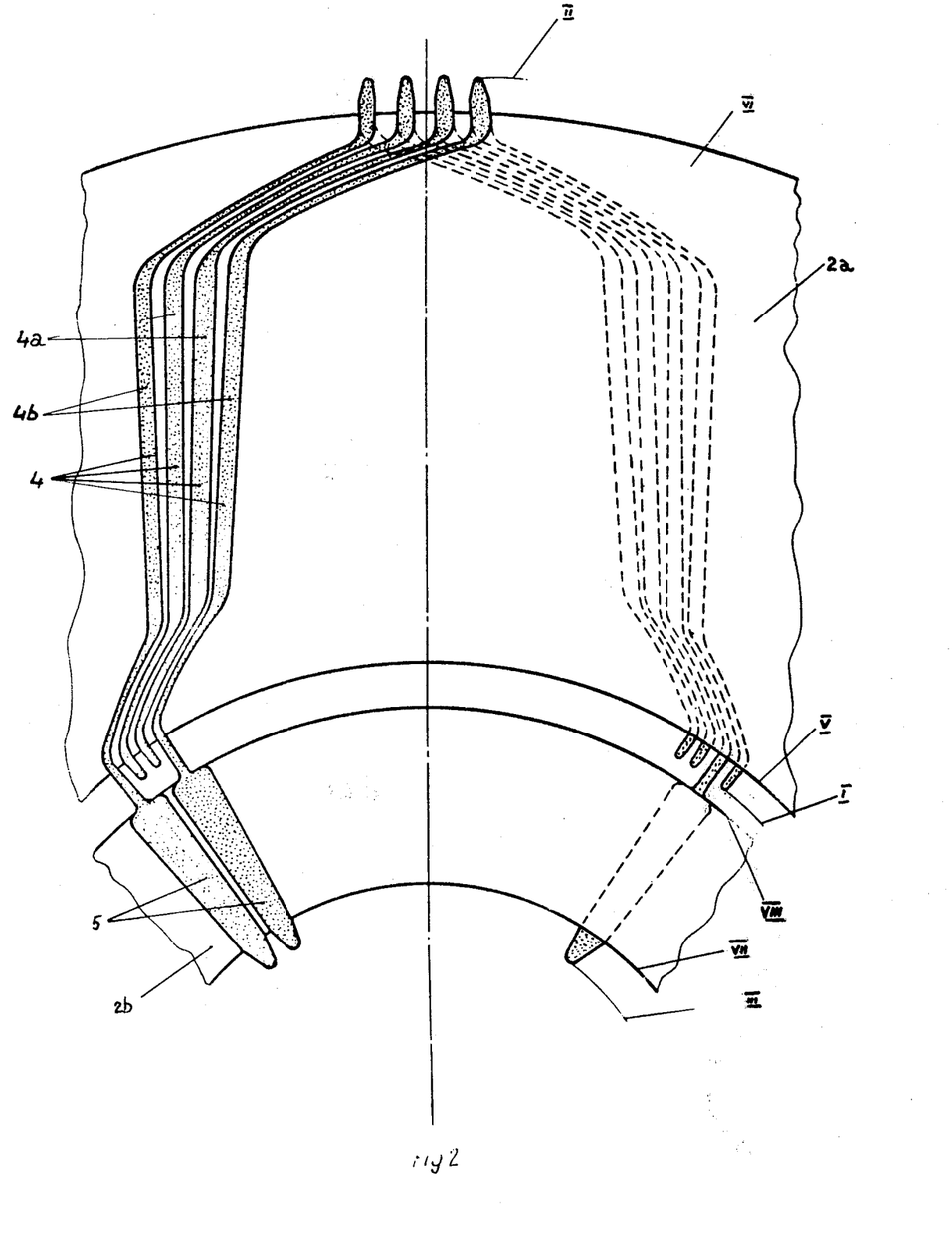
FIG. 2 is a partial front view of a disk rotor subassembly.
Figure 3:
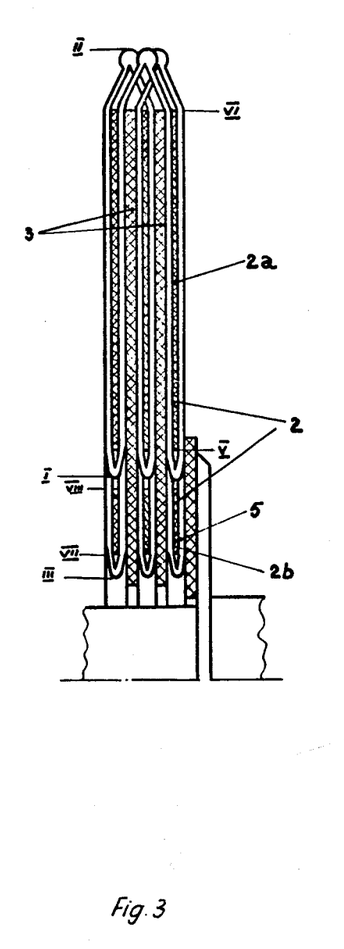
FIG. 3 is a section through a disk rotor with commutators on all the layers.

According to the invention, as shown in FIGS. 2 – 3, a rotor with stamped lamellar conductors and commutators on all the layers is made up of an even number of identical conductive layers 1, separated by $(s - 1)$ insulating layers 2 and 3, each conductive layer containing N lamellar conductors 4 each extended as a commutator 5. The number of turns per section, as well as the ratio $m$ between the conductor number N and the commutator bar number K, on a layer, is greater than two. A number $(N/m)$ of conductors on a layer is extended as commutator bars 5, and the balance $$\frac{m-1}{m}N$$

of the conductors end at an intermediate level I, and have no commutator bars. The conductors from different layers are welded at $s/2N$ points at the exterior level II, at $(SN/2m)$ points at the interior level III, and at $$\frac{s(m-1)N}{2m}$$

points at the intermediate level I. The disk rotor has $s/c$ commutators but the brushes ride only on one layer, which is to be found on the end rotor, and after its partial wear, the rotor is reversed, the commutator array on the opposite side being then used.

Figure 4:
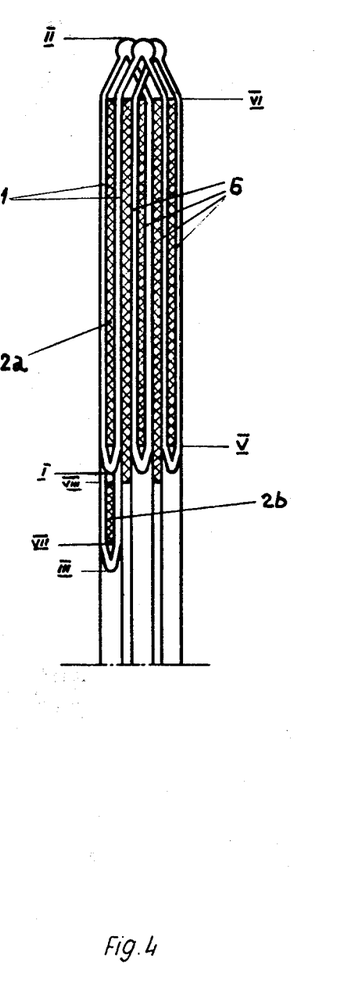
FIG. 4 is a section through a disk rotor with commutators only on two adjoining layers.
Figure 5:
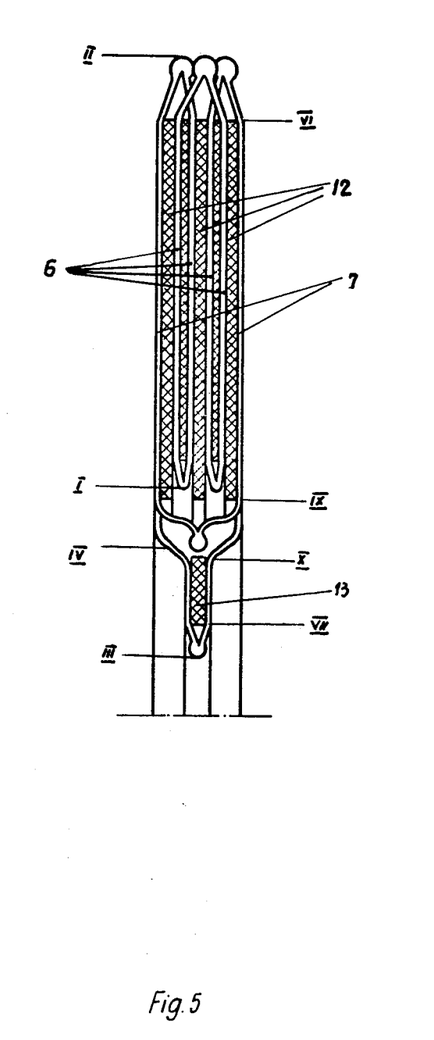
FIG. 5 is a section through a disk rotor with commutators only on the two extreme lateral layers.

According to the invention, as shown in FIG. 4, the rotor with stamped lamellar conductors and commutators only on two adjoining layers is made up of two identical conductive layers 1, as in FIGS. 4 and 5, the other $(s-2)$ conductive layers 6 having its conductors terminating at the intermediate level I without commutator bars. The conductors of the two layers with commutator are welded at $(N/m)$ points at the interior level III, and at $$\frac{(m-1)N}{m}$$

points at the intermediate level I. Each of the other $(s-2)$ layers 6 without commutators is welded at $N$ points at the intermediate level I, so that at the intermediate level I the rotor has $$\left(\frac{m-1}{m} \cdot \frac{s-2}{2}\right)N = \left(\frac{s}{2} - \frac{1}{m}\right)N$$

solder points or locations. At the exterior level II the conductors are welded in $(sN/2)$ points.

According to the invention, as shown in FIG. 5, the rotor with stamped lamellar conductors and commutators only on the two extreme lateral or end layers is similar to that shown in FIG. 4, except that the two conductive layers 7 with commutators are not put side by side, but on ends of the rotor. In addition solderings of the IV intermediate level between the conductors of these two layers are placed at a small diameter level than the other solderings of the I intermediate level on the layers without commutators.

Figure 1:
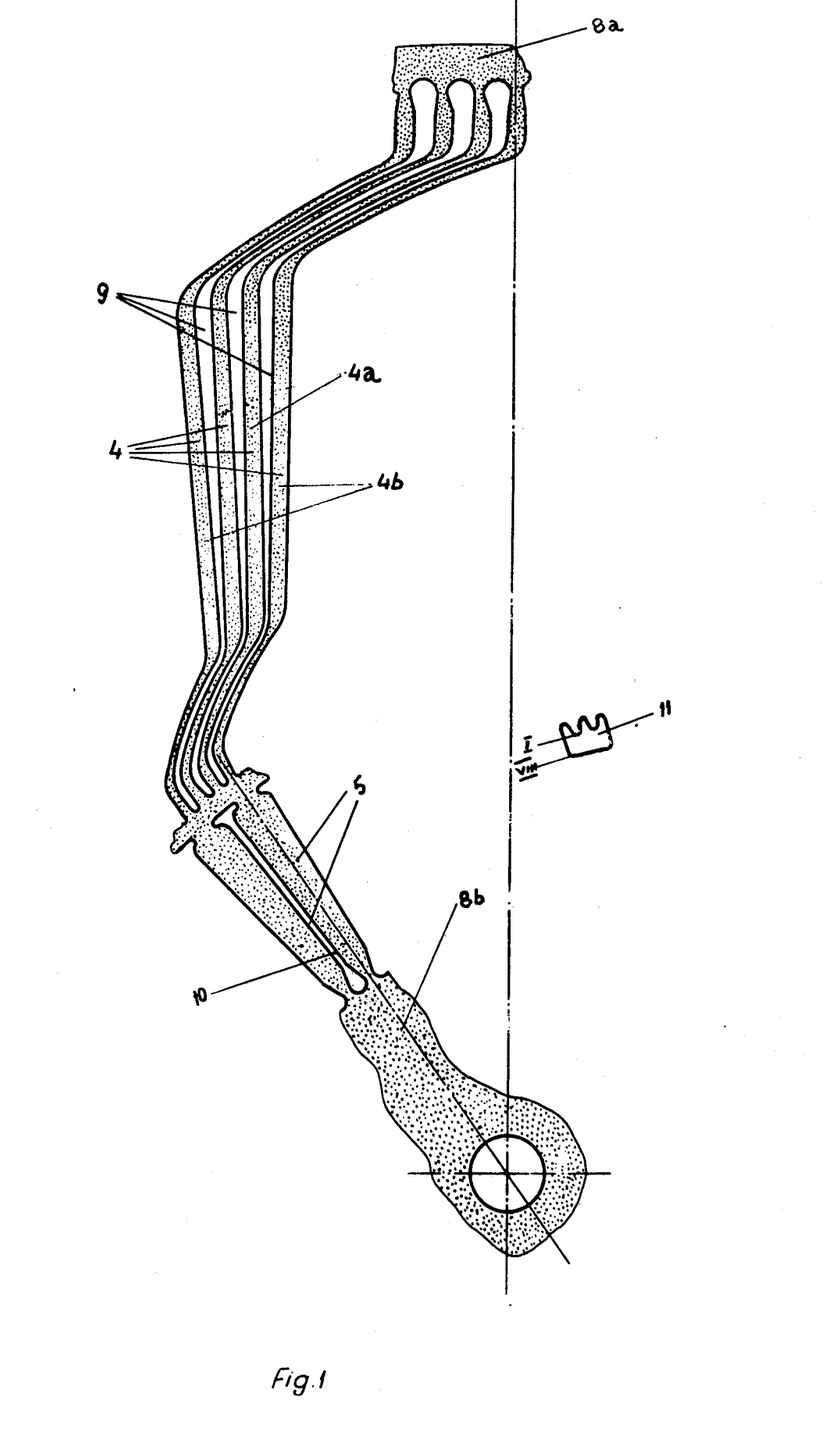
FIG. 1 is a partial front view of a disk rotor conductor layer.

The two-layer stamped lamellar-conductor disk rotor is manufactured as follows:

Conductive disks are cut from a conductive foil their diameter being larger than the II exterior level as shown in FIG. 1, the difference constituting the exterior conductive addition 8a. The empty spaces 9 between the conductors 4 and the empty spaces 10 between the commutator bars 5 are circularly stamped in the conductive disks, conductive layers being thus obtained.

On an insulating layer or substrate annulus 2 there are soldered two conductive layers, one turned by 180° relative to the other, so that the conductor terminals at the III interior and II exterior levels register at their ends, thus forming soldered conductive layers. The insulating layer 2 is made up of two conplanar annular and circular rings, an outer ring 2a between the levels V and VI, and an inner ring 2b between the levels VII and VIII. The assembly thus obtained is stamped out by a punch 11 which fits between the levels I and VIII and has a shape that detaches of the conductors 4a from the commutator bars 5. In this way, on each conductive layer are formed $N/m$ conductors 4b, which extend into commutator bars and $$\frac{(m-1)N}{m}$$

conductors 4a, without commutators bars, here in a 1:3 ratio. The conductive addition 8a which extends beyond the exterior level II is cut out as well as the conductive addition 8b which extends beyond the interior level III to obtain an unwelded rotor. The connections between the conductors on the two sides are made at $(N/m)$ longitudinal solderings at the interior level III, by N longitudinal solderings at the exterior level II, and by $$\frac{(m-1)N}{m}$$

transverse solderings at the intermediate level I, the complete rotor being thus obtained.

According to the invention, the disk rotor with lamellar conductors stamped in four or in an even greater number of layers, s 4, is manufactured in several manners, as follows:

In the version of FIG. 3 the rotor has all its conductive layers provided with a commutator so it is made up of $(s/2)$ rotor subassemblies, manufactured in a similar way as in the case of the two-layer rotor of FIG. 2 with the only difference that at the exterior level II, the unwelded conductors terminals on the two layers are shifted so as to overlap on the corresponding conductors terminals of the other rotor subassemblies, to allow them to be soldered in order to weld together. The solder connections at the interior level III and at the intermediate level I are separately performed for each of the rotor subassemblies before assembling the rotor by securing $(s/2)$ independent subassemblies with $s/2 - 1$ intermediate insulating layers 3. The solder joints at level II are made after this assembling has been achieved. Thus, at the interior level III $(sN/2m)$ longitudinal solder joints are made, at the intermediate level I $$\frac{s(m-1)N}{2m}$$

transverse solder joints, and at the exterior level II $sN/2$ longitudinal solder joints.

In FIG. 4, the rotor has stamped lamellar conductors and commutators of the other $(s-2)$ layers without commutator bars. These conductors end at the intermediate level I. The rotor subassembly made up of the two layers with commutators is identical to that of the FIG. 2; the other $$\frac{s-2}{2}$$

subassemblies have an insulating layer made up of a single circular ring 2a between the levels V and VI, and the cutting-off of the conductive addition which extends beyond the conductor terminal is made at the levels I and II. The conductors of each of the $(s/2-1)$ rotor subassemblies without commutator are longitudinally welded at the intermediate level I, and after the rotor is assembled in exactly the same manner as in FIG. 3, the longitudinal solderings at the exterior level II are made. There follows that the rotor has at the interior level III, $N/m$ longitudinal solder joints, at the exterior level II, $(sN/2)$ longitudinal solder joints, and at the intermediate level I, $(s/2-1)N$ longitudinal solder joints and $$\frac{m-1}{m}N$$

transversal solder joints.

In the version of FIG. 5, the rotor with stamped lamellar conductors and commutators only on the two end conductive layers, has the other $(s-2)$ intermediate layers similar to those of FIG. 4 all the conductors being without commutator bars, ending at the intermediate level I. The $(s/2 - 1)$ rotor subassemblies without commutator are manufactured as in FIG. 4, then they are soldered together sandwiching insulating layers 12, thus making up the rotor package. The two conductive layers with commutators, in which the empty spaces between the conductors and the commutator bars are stamped around the rotor package when assembling, are separated by three insulating layers 12 having a circular ring shape, two of them between the levels VI and IX and one of them on each side. A third ring 13 is secured between the levels VII and X. Then a punch 11 strips out around the package between the levels IV and X. The punch has a shape which creates a detachment between the conductors without bars 4a and the commutator bars 5. Thus, the intermediate level IV at which the conductors 4a without commutator bars end is below the intermediate level I of the conductors terminals on the layers without commutators. The conductive addition which extends beyond the exterior II and the interior levels III is out off. The conductors on the extreme lateral layers provided with commutators are longitudinally welded at the interior level III and transversely connected at the intermediate level IV. Then the conductors at the exterior level II are welded longitudinally together. The weld number 5 at different levels performed upon the rotor is the same as in FIG. 4.

Figure 6:
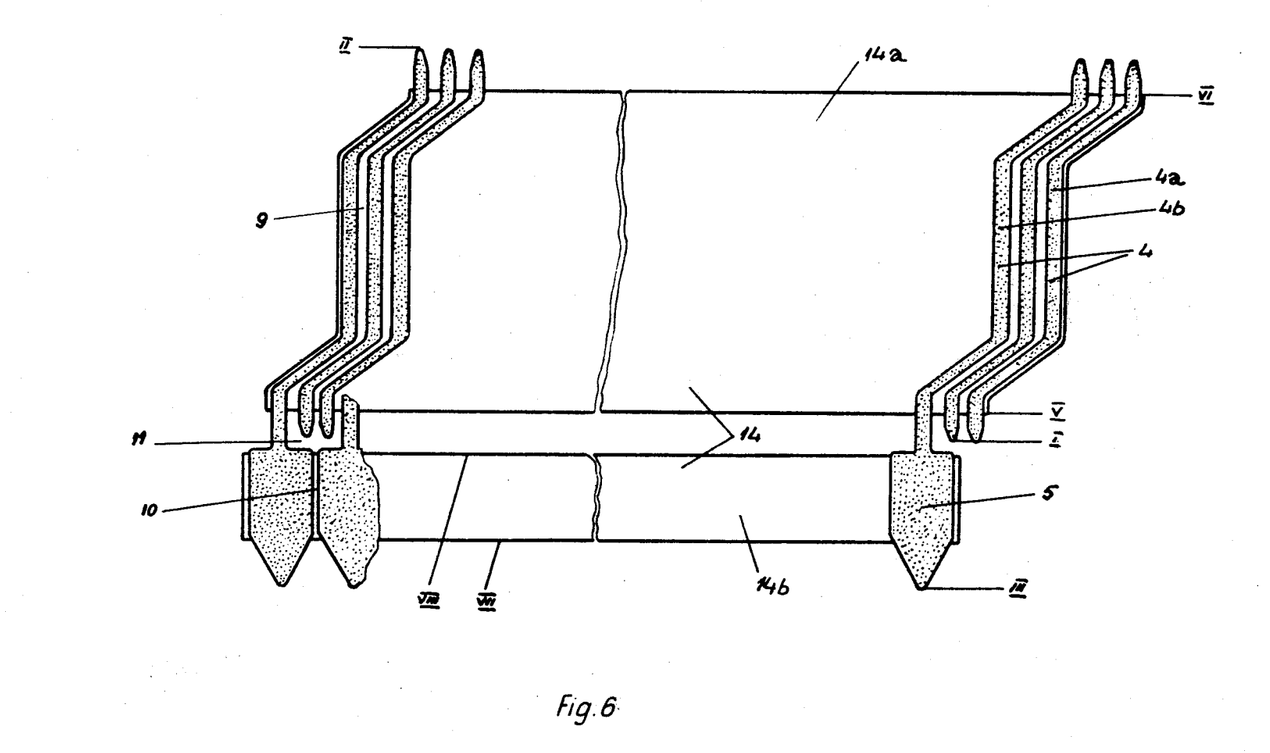
FIG. 6 is a partial view of a cut-out layer of a cylindrical cup rotor.
Figure 7:
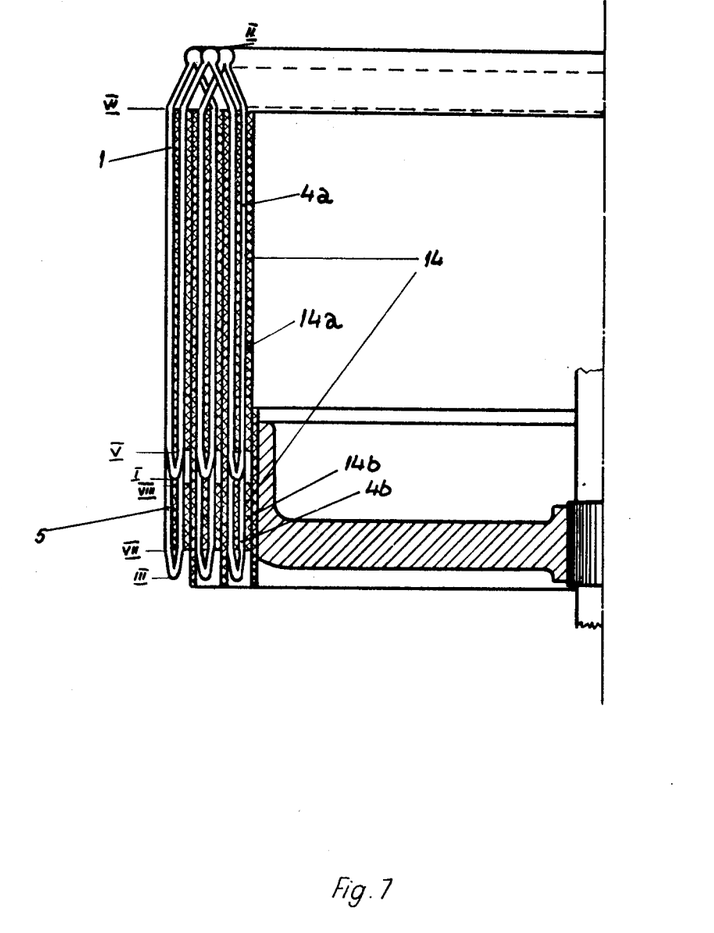
FIG. 7 is a section through a cylindrical cup rotor with commutators on all the layers.

The cup cylinder rotor according to FIGS. 6 and 7 with stamped lamellar conductors is manufactured in the same manner as the disk rotor, except for the following differences:

conductive bands instead of conductive disks are stamped out of a conductive foil;

the stamping-out of the empty spaces between the conductors 9 and between commutator bars 10, which form the conductive layers 1, is performed linearly, not circularly;

because of the conductive layers position on the cylindrical rotor, the empty spaces stamping step, performed by the same punches, is different, so that the conductive layers have various lengths making possible their formation into cylindrical tubes; in this case, the conductors' widths do not differ much in the varios layers;

each conductive layer 1 provided with commutator bars is soldered on an insulating layer 14 made up of two insulating bands, one of them 14a between the levels V and VI, and the other 14b between the levels VII and VIII;

the stamping by means of a punch between the levels I and VIII serving to detach the conductors 4a without commutator bars 5, is made linearly, not circularly, and separately on each of the conductive layers soldered with insulating bands;

the cutting-off, regarding the conductive layers provided with commutator bars, of the conductive addition which extends beyond the levels II and III is made along straight, not circular lines, and in addition the edge insulating addition, is cut off parallel to the conductors, and with the end commutator bars respectively so several cut-off layers are obtained.

each conductive layer without commutator bars is bonded to an insulating band 14a between levels V and VI;

the cutting-off, on the conductive layers without commutator bars of the conductive addition which extends beyond the levels I and II is made along straight, not circular, lines and, in addition the edge insulating addition is cut off parallel to the two end conductors, so several cut-out layers are obtained;

the two-layer unwelded rotor assembly and the unwelded rotor subassemblies for the rotors with an even (more than two) number of layers, all of them or only two adjoining ones provided with commutators are obtained as follows: on each face of a cylindrical tube two cut-off layers are bonded, the layers having their conductors conversely oriented, and with the insulatings bands situated towards the inside of the cylinder;

the two-layered rotor assembly and the rotor subassemblies for the rotors with an even (more than two) number of layers all provided with commutators, are obtained by welded the conductors at the levels III longitudinally and at I transversely and only for the two layered rotor assemblies at the II level longitudinally;

the rotor assembly with a number of layers greater than two and even, each layer provided with commutators, is obtained by introducing the rotor subassemblies rolled on cylinders of different diameters one into the other and by bonding them to intermediate insulating layers and by welding the conductors at the II level longitudinally;

the rotor subassemblies for the rotors with an even (more than two) number of layers of which only two adjoining layers are provided with commutator bars, are made by forming on the unwelded rotor subassemblies the conductor welds at level I longitudinally;

the assembly with an even (more than two) number of layers of which only two layers are provided with commutator bars is obtained by introducing the rotor subassemblies with and without commutators rolled on different diameters cylinders one into the other, by bonding them to intermediate insulating layers so that the commutators will be accessible, and by welding the conductors at the II level longitudinally;

the rotor package for the rotors with a number of layers which is even and greater than two and of which only the two end layers are provided with commutators is obtained by introducing the rotor subassemblies without commutator one into the other rolled on different diameters cylinders and bonding them to insulating layers.

the rotor assembly with an even (more than two) number of layers, of which only the two end layers are provided with commutators, is obtained by rolling the two cut-off layers provided with commutators which have different lengths and different conductor spacing onto insulating layers, on the two extreme sides of the rotor package and by soldering together conductors on the extreme layers at the levels III longitudinally and at IV transversely and soldering the conductors on all the layers at the II level longitudinally.

The number of welds at different levels of the cylindrical cup rotor for each embodiment is the same with that of the disk rotors for the similar configurations.

In the cylindrical cup rotors, no matter what the number of layers provided with commutators, one uses only one commutator which remains accessible.

According to the invention, the disk and cylindrical cup rotors with two layers of stamped lamellar conductors can have windings with the turns number per section in the ratio $m = (N/K,)$ always greater than two of a simply waved closed type, whose series-connected conductors make up two paths of current in parallel, $2a = 2$, or multiple wave type, whose series-connected conductors make up $2a > 2$ paths of current in parallel, double waved $2a = 4$, triple waved $2a = 6$, etc.

According to the invention, these windings can be executed taking into account the number of pole pairs p and the ratio according to Table 1 for simple waved windings where $a = 1$, according to Table 2 for double waved windings where $a = 2$, and according to Table 3 for triple waved windings where $a = 3$, because they must satisfy the relation $$y = \frac{mK \pm a}{p} = \text{whole number.}$$

In these Tables the plus sign indicates the possibility of performing the winding for a given $p$ and $m$, and the minus sign indicates the impossibility of doing this. Thus, for example, for $a = 1$ and $p = 8$ in Table 1, there follows that one can design windings only for an odd $m$; for $a = 2$ and $p = 4$ in Table 2, there follows that one can design windings only for $m$ different from 4 or a multiple of 4, and for $a = 3$ and $p = 3$, in Table 3, there follows that one can design windings for any value of $m$.

According to the invention, the windings for disk rotors and cylindrical cup rotors with stamped lamellar conductors in an even number of layers can form windings with the number of turns per section, with a ratio $m = (N/K)$ greater than two, of a closed type, simple or multiple waved per pair of layers, and with the brushes riding on one of the layers. On the other pairs of layers, the windings having an even number of parallel paths of current.

Figure 8:
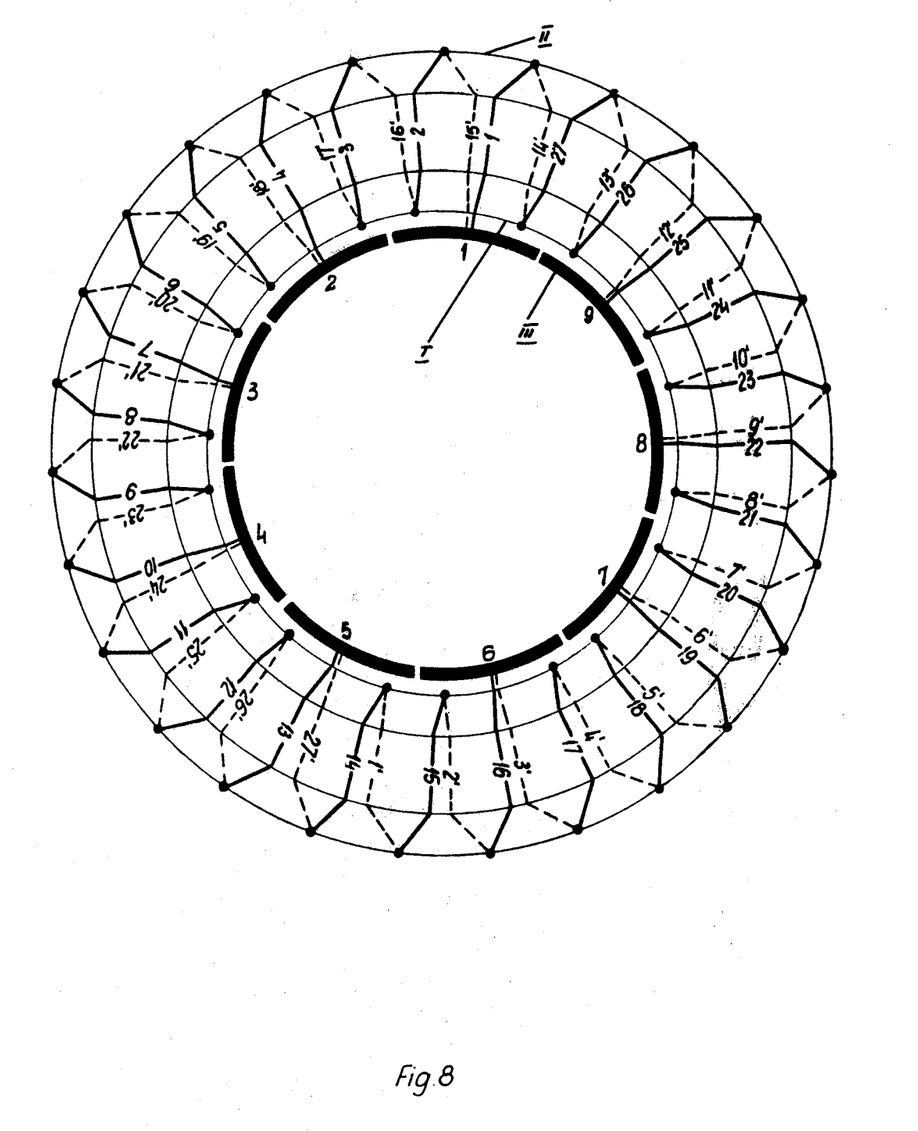
FIG. 8 is a winding diagram of a closed series simple waved winding, wherein the number $s$ of layers $= 2$, $p = 1$, the number $a$ of current-pair paths $= 1$, and $N = 27$.

In the winding diagram in FIG." 8 an example is shown of winding in two layers, simple waved, where the number of turns per section is 3, and where the number of commutator bars is one-third the number of conductors per layer ($N = 27$, $K = N/m = 27/3 = 9$). The resulting calculation is $$y = \frac{mK - a}{p} = \frac{3 \cdot 9 - 1}{1} = 26,$$

the forward step is $Y_1 = 13$ and the backward step $y_2 = 13$. The number of welds at level II is $$\frac{sN}{2} = \frac{2 \cdot 27}{2} = 27,$$

at level I it is $$\frac{s(m-1)N}{2m} = \frac{2(3-1) \cdot 27}{2 \cdot 3} = 18,$$

and at level III it is $$\frac{sN}{2m} = \frac{2 \cdot 27}{2 \cdot 3} = 9.$$

Figure 9:
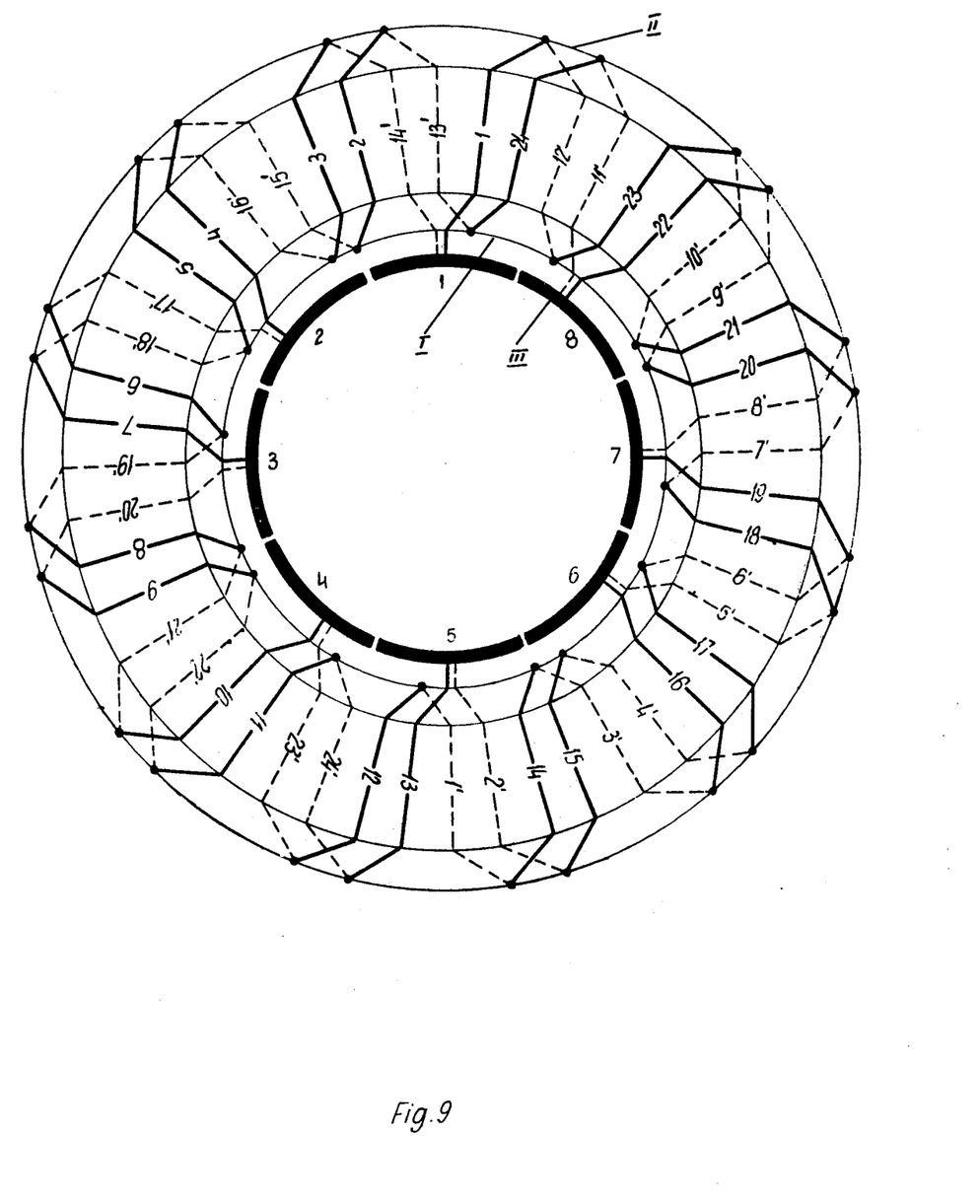
FIG. 9 is a winding diagram of a closed, double waved winding, wherein $s = 2, p = 1, a = 2, N = 24$.

In the winding diagram of FIG." 9 an example is shown of

Table 1.

| p \ m | 1 | 2 | 3 | 4 | 5 | 6 | 7 | 8 | 9 | 10 | NOTES |
|---|---|---|---|---|---|---|---|---|---|---|---|
| | | | | | | | | | | $a = 1$, a simple waved winding | |
| 1 | + | + | + | + | + | + | + | + | + | G2z | always possible |
| 2 | + | − | + | − | + | − | + | − | + | − | $m = 2n$, impossible |
| 3 | + | + | − | + | + | − | + | + | − | + | $m = 3n$, impossible |
| 4 | + | − | + | − | + | − | + | − | + | − | $m = 2n$, impossible |
| 5 | + | + | + | + | − | + | + | + | + | − | $m = 5n$, impossible |
| 6 | + | − | − | − | + | − | + | − | − | − | $m = 2n$, $m = 3n$, impossible |
| 7 | + | + | + | + | + | + | − | + | + | + | $m = 7n$, impossible |
| 8 | + | − | + | − | + | − | + | − | + | − | $m = 2n$, impossible |
| 9 | + | + | − | + | + | − | + | + | − | + | $m = 3n$, impossible |
| 10 | + | − | + | − | − | − | + | − | + | − | $m = 2n$, $m = 5n$, impossible |
| NOTES | Always possible | $p = 2n$, impossible | $p = 3n$, impossible | $p = 2n$, impossible | $p = 5n$, impossible | $p = 2n$, $p = 3n$, impossible | $p = 7n$, impossible | $p = 2n$, impossible | $p = 3n$, impossible | $p = 2n$, $p = 5n$, impossible | $n$ = whole number |

Table 2

| p \ m | 1 | 2 | 3 | 4 | 5 | 6 | 7 | 8 | 9 | 10 | NOTES |
|---|---|---|---|---|---|---|---|---|---|---|---|
| | | | | | | | | | | $a = 2$, double waved winding | |
| 1 | + | + | + | + | + | + | + | + | + | + | Always possible |
| 2 | + | + | + | + | + | + | + | + | + | + | Always possible |
| 3 | + | + | − | + | + | − | + | + | − | + | $m = 3n$, impossible |
| 4 | + | + | + | − | + | + | + | − | + | + | $m = 4n$, impossible |
| 5 | + | + | + | + | − | + | + | + | + | − | $m = 5n$, impossible |
| 6 | + | + | − | + | + | − | + | + | − | + | $m = 3n$, impossible |
| 7 | + | + | + | + | + | + | − | + | + | + | $m = 7n$, impossible |
| 8 | + | + | + | − | + | + | + | − | + | + | $m = 4n$, impossible |
| 9 | + | + | − | + | + | − | + | + | − | + | $m = 3n$, impossible |
| 10 | + | + | + | + | − | + | + | + | + | − | $m = 5n$, impossible |
| NOTES | Always possible | Always possible | $p = 3n$, imposs- | $p = 4n$, imposs- | $p = 5n$, imposs- | $p = 3n$, imposs- | $p = 7n$, imposs- | $p = 4n$, imposs- | $p = 3n$, imposs- | $p = 5n$, imposs- | $n$ = whole number |

Table 2-continued

| p  m | 1 | 2 | 3 | 4 | 5 | 6 | 7 | 8 | 9 | $a = 2$, double waved winding 10 | NOTES |
|---|---|---|---|---|---|---|---|---|---|---|---|
|  |  | ible | ible | ible | ible | ible | ible | ible | ible |  |  |

Table 3

Figure 10:
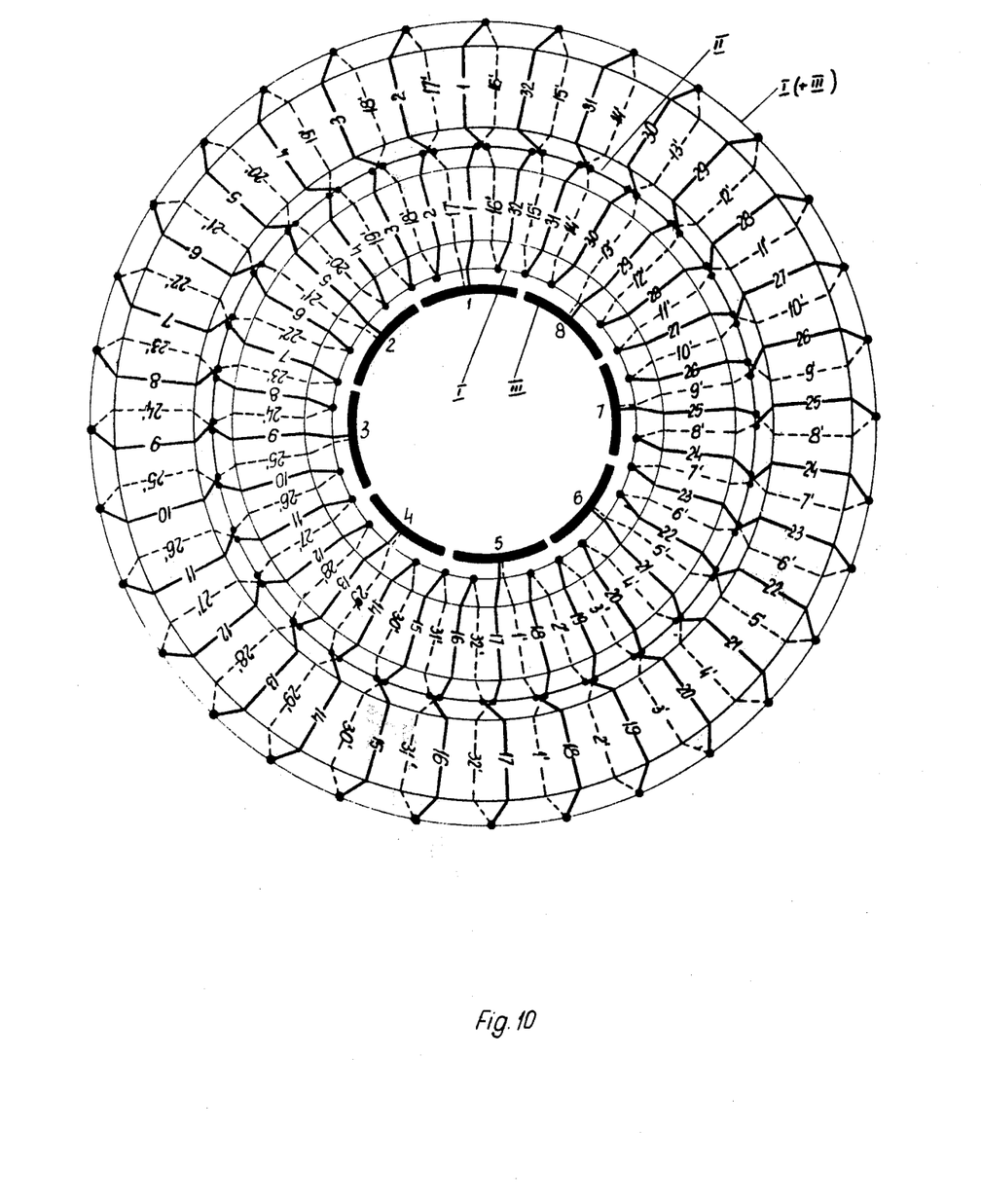
FIG. 10 is a winding diagram of a closed series curly-waved winding, wherein $s = 4, p = 1, a = 1, N = 32$.

| p  m | 1 | 2 | 3 | 4 | 5 | 6 | 7 | 8 | 9 | $a = 3$, triple waved winding 10 | Notes |
|---|---|---|---|---|---|---|---|---|---|---|---|
| 1 | + | + | + | + | + | + | + | + | + | + | Always possible |
| 2 | + | − | + | − | + | − | + | − | + | − | $m = 2n$, impossible |
| 3 | + | + | + | + | + | + | + | + | + | + | Always possible |
| 4 | + | − | + | − | + | − | + | − | + | − | $m = 2n$, impossible |
| 5 | + | + | + | + | − | + | + | + | + | − | $m = 5n$, impossible |
| 6 | + | − | + | − | + | − | + | − | + | − | $m = 2n$, impossible |
| 7 | + | + | + | + | + | + | − | + | + | + | $m = 7n$, impossible |
| 8 | + | − | + | − | + | − | + | − | + | − | $m = 2n$, impossible |
| 9 | + | + | + | + | + | + | + | + | − | + | $m = 9n$, impossible |
| 10 | + | − | + | − | − | − | + | − | + | − | $m = 2n$, $m = 5n$, impossible |
| NOTES | Always possible | $p = 2n$, impossible | Always possible | $p = 2n$, impossible | $p = 5n$, impossible | $p = 2n$, impossible | $p = 7n$, impossible | $p = 2n$, impossible | $p = 9n$, impossible | $p = 2n$, $p = 5n$, impossible | $n =$ whole number | winding in four layers, waved rippled series rippledseries winding, where $2a = = 2$; wherein the number of turns per section is 8, and whose number of commutator bars is four times less than the number of conductors per layer: $N = 32$, $K = N/m = 32/4 = 8$; the resulting step is $$y = \frac{mK - a}{p} = \frac{4 \cdot 8 - 1}{1} = 31$$

with $y_1 = 15$ and $y_2 = 16$. Manufactured with commutators on all the conductive layers, the number of welds at the II level is $$\frac{sN}{2} = \frac{4 \cdot =}{2} = 64;$$

at the level III it is $$\frac{sN}{2m} = \frac{4 \cdot 32}{2 \cdot 4} = 16,$$

and at the level I it is $$\frac{s(m-1)N}{2m} = \frac{4(4-1) \cdot 32}{2 \cdot 4} = 48.$$

Manufactured with commutators only on two adjoining layers, or only on the two extreme end layers, the number of welds at the level II is $$\frac{sN}{2} = \frac{4 \cdot 32}{2} = 64,$$

at the level III it is $N/m = 32/4 = 8$, and at the level I it is $(s/2 - 1/m)N = (4/2 - 1/4) \cdot 32 = 56$.

Figure 11:
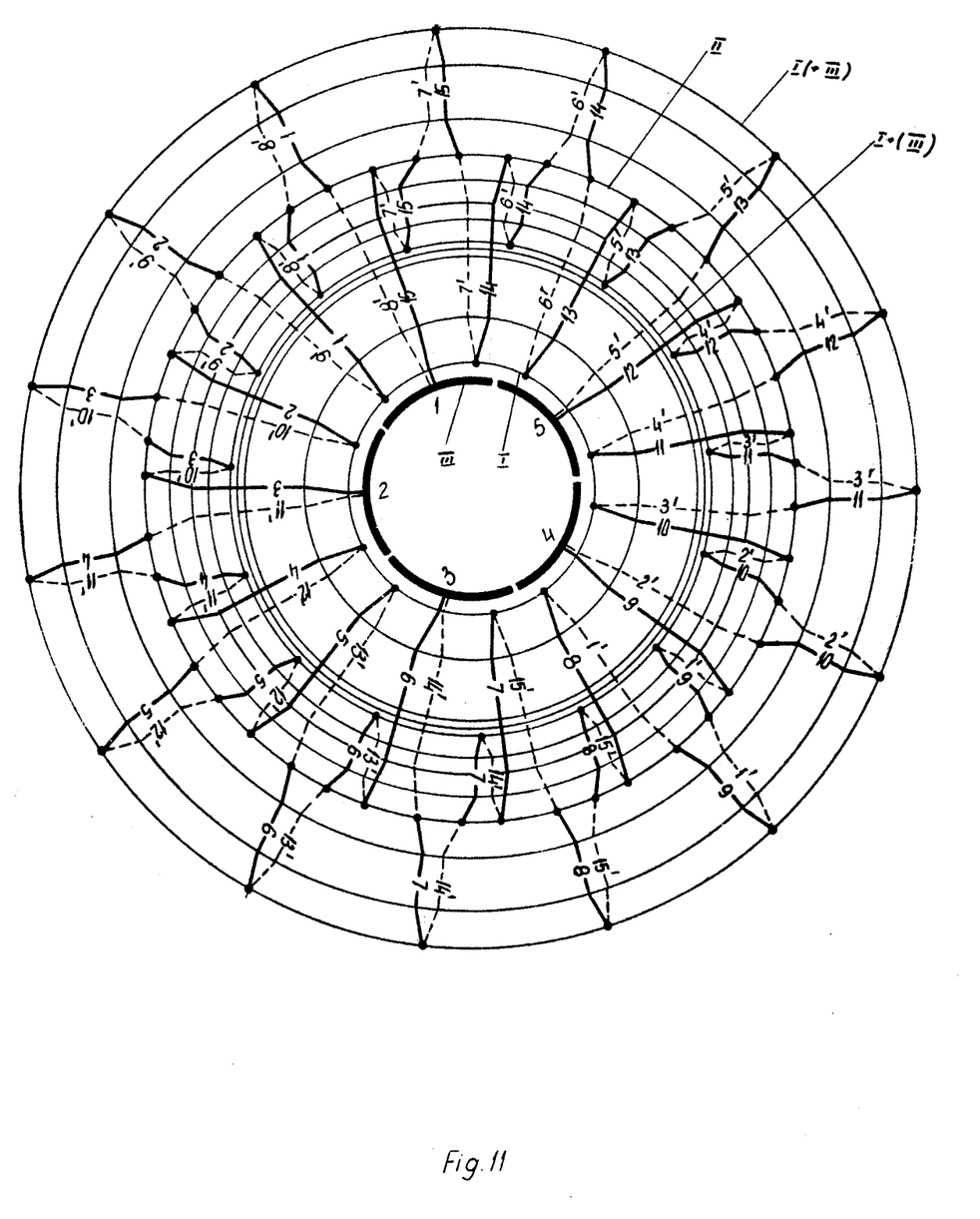
FIG. 11 is a winding diagram of a closed series, wave waved winding wherein $s = 6, p = 1, a = 1, N = 15$.

In the winding diagram of FIG. 11, an example is shown of winding in six layers, waved - waved - waved series winding, whose number of turns per section is 9, and whose number of commutator bars is one-third the number of conductors per layer; $N = 15$, $K = N/m = 15/3 = 5$; the resulting step is $$y = \frac{mK - a}{p} = \frac{3 \cdot 5 - 1}{1} = 14 \text{ with } y_1 = y_2 = 7.$$

with $y_1 = Y_2 = 7$. Manufactured with commutators on all the conductive layers, the number of welds at the level II is $$\frac{sN}{2} = \frac{6 \cdot 15}{2} = 45,$$

at the level III it is $$\frac{sN}{2m} = \frac{6 \cdot 15}{2 \cdot 3} = 15,$$

and at the level I it is $$\frac{s(m-1)N}{2m} = \frac{6(3 - 1) \cdot 15}{2 \cdot 3} = 30.$$

Manufactured with commutators only on two adjoining layers, or only on the two extreme end layers, the number of welds at the level II is $$\frac{sN}{2} = \frac{6 \cdot 15}{2} = 45,$$

at the level III it is $N/m = 15/3 = 5$, and at the level I it is $(s/2 - 1/m)N = (6/2 - 1/3) \cdot 15 = 40$.

The invention has the following advantages:

It is applicable to direct-current electric machines having any number of pole pairs by judiciously choosing the ratio between the conductor number on one side of the disk and the commutator-bar number, using truth Tables 1, 2, and 3.

The service life of the rotors is prolonged due to the existence of a commutator with only a few wide bars. In the case of disk rotors, this service life is practically doubled by the utilization, in turn, of two commutators on the extreme lateral side.

The rotor disk diameter, in the case of the disk rotor, is reduced because the number at the commutators is relatively small and therefore, the commutators can fit in a circle with a small radius; moreover, the commutator bars are wide so that the commutator size can be diminished in a radial sense using the same brush section.

Because of these reasons, in a cylindrical rotor, the commutator is shorter in the axial direction.

When there is a greater number of layers, the increased number of series conductors permits a higher voltage to be utilized at the same power, resulting in less current losses and a higher efficiency.

The great number of possible winding arrangements for stamped lamellar conductor rotors permits a choice, so that the smallest possible rotors for different applied voltages can be used.

We claim:

1. A rotor comprising:
   at least one dielectric support body formed as a body of revolution and having an outer periphery, an inner periphery, an intermediate region between said peripheries, and a pair of opposite faces;
   a layer of conductors on each of said faces, each conductor having an outer end extending beyond said outer periphery and there joined to another outer end of another such conductor, at least every second conductor of each layer having an inner end joined at said intermediate region to an inner end of another such conductor of the other layer, the remaining conductors of each layer having inner ends extending beyond said intermediate region and being widened adjacent said inner periphery to form integral commutator bars joined with the commutator bars of the other layer, said conductors forming a closed waved series winding with at least two parallel current paths; and
   a second such support body and a second pair of such conductor layers thereon, said conductors of all of said layers forming a multiple waved winding with an even number of parallel current paths.

2. The rotor defined in claim 1 wherein said conductors form a closed multiple wave winding with four parallel paths.

3. The rotor defined in claim 1 wherein said conductors form a closed multiple wave winding with six parallel current paths.

4. The rotor defined in claim 1, further comprising a second such support body and a second pair of such conductor layers thereon, said conductors of all of said layers forming a simple waved winding with an even number of parallel current paths.

5. The rotor defined in claim 1, further comprising a second such support body and a second pair of such conductor layers thereon, said conductors of all of said layers forming a multiple waved winding with an even number of parallel current paths.

6. The rotor defined in claim 1, further comprising additional such support bodies adjacent the first-mentioned support body and each carrying a pair of said layers of conductors.

7. The rotor defined in claim 6 wherein said conductors on all of said layers form a closed waved winding with an even number of parallel current paths.

8. The rotor defined in claim 6 wherein said conductors on all of said layers form a simple waved winding with an even number of parallel current paths.

9. The rotor defined in claim 6 wherein said conductors on all of said layers form a multiple waved winding with an even number of parallel current paths.

10. The rotor defined in claim 6 wherein the conductors on two of said layers form a simple waved winding and the conductors on the other layers a multiple curled winding with an even number of parallel current paths.

* * * * *